US010800408B2

(12) United States Patent
Xu et al.

(10) Patent No.: US 10,800,408 B2
(45) Date of Patent: Oct. 13, 2020

(54) DETERMINING DRIVING PATHS FOR AUTONOMOUS DRIVING THAT AVOID MOVING OBSTACLES

(71) Applicant: Baidu USA LLC, Sunnyvale, CA (US)

(72) Inventors: Kecheng Xu, Sunnyvale, CA (US); Jinghao Miao, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 106 days.

(21) Appl. No.: 15/988,901

(22) Filed: May 24, 2018

(65) Prior Publication Data

US 2019/0359205 A1 Nov. 28, 2019

(51) Int. Cl.

| | |
|---|---|
| ***B60W 30/09*** | (2012.01) |
| ***B60W 30/095*** | (2012.01) |
| ***G06K 9/00*** | (2006.01) |
| ***G05D 1/02*** | (2020.01) |
| ***G05D 1/00*** | (2006.01) |

(52) U.S. Cl.

CPC ........ *B60W 30/09* (2013.01); *B60W 30/0953* (2013.01); *B60W 30/0956* (2013.01); *G05D 1/0088* (2013.01); *G05D 1/0238* (2013.01); *G05D 1/0253* (2013.01); *G05D 1/0257* (2013.01); *G06K 9/00805* (2013.01); *B60W 2420/42* (2013.01); *B60W 2420/52* (2013.01)

(58) Field of Classification Search

CPC ............. B60W 30/09; B60W 30/0953; B60W 30/0956; B60W 2420/52; B60W 2420/42; G05D 1/0257; G05D 1/0253; G05D 1/0238; G05D 1/0088; G06K 9/00805

USPC .......................................................... 701/301

See application file for complete search history.

(56) References Cited

U.S. PATENT DOCUMENTS

| | | | | |
|---|---|---|---|---|
| 8,090,537 | B2 * | 1/2012 | Nishira | G05D 1/0214 340/436 |
| 2008/0113672 | A1 * | 5/2008 | Karr | G01S 1/026 455/456.1 |
| 2014/0074388 | A1 * | 3/2014 | Bretzigheimer | B60T 1/10 701/117 |
| 2015/0371095 | A1 * | 12/2015 | Hartmann | G06K 9/00791 348/148 |
| 2016/0224027 | A1 * | 8/2016 | Yamamoto | B60W 30/09 |
| 2017/0057497 | A1 * | 3/2017 | Laur | B60W 30/0953 |
| 2018/0005450 | A1 * | 1/2018 | Daniels | G01S 19/01 |
| 2018/0229723 | A1 * | 8/2018 | Jiang | B60W 10/20 |
| 2018/0233047 | A1 * | 8/2018 | Mandeville-Clarke | B62D 15/0255 |
| 2019/0072969 | A1 * | 3/2019 | Han | G01C 21/26 |

* cited by examiner

*Primary Examiner* — Jonathan M Dager
*Assistant Examiner* — Jean W Charleston
(74) *Attorney, Agent, or Firm* — Womble Bond Dickinson (US) LLP

(57) ABSTRACT

An ADV may determine a predicted path for a moving obstacle. The ADV may determine a predicted area based on the predicted path. The ADV may determine a path for the ADV based on the predicted area. The path for the ADV may avoid the predicted area when determining the path for the ADV.

20 Claims, 13 Drawing Sheets

DETERMINING DRIVING PATHS FOR AUTONOMOUS DRIVING THAT AVOID MOVING OBSTACLES

TECHNICAL FIELD

Embodiments of the present disclosure relate generally to operating autonomous driving vehicles. More particularly, embodiments of the disclosure relate to determining paths or routes for autonomous driving vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. Particularly, trajectory planning is a critical component in an autonomous driving system. Conventional trajectory planning techniques rely heavily on high-quality reference lines, which are guidance paths, e.g., a center line of a road, for autonomous driving vehicles, to generate stable trajectories.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment may be included in at least one embodiment of the disclosure. The appearances of the phrase "in one embodiment" in various places in the specification do not necessarily all refer to the same embodiment.

According to some embodiments, a new method for determining a path for an autonomous driving vehicle (ADV) is utilized. Various moving obstacles/objects may be located in the same geographical area where an ADV is travelling/located. These moving obstacles may move unpredictably. For example, although a pedestrian may be moving along a path, the pedestrian may suddenly change direction (e.g., turn left) or may accelerate/decelerate. This may cause problems when attempting to predict the path of the moving object in order to avoid colliding with, hitting, or striking the moving object. Thus, it may be useful to determine (e.g., calculate, compute, obtain, etc.) an area that includes possible locations where a moving obstacle may move to.

The ADV may determine a predicted area that includes possible areas where a moving obstacle may move to. The predicted area may include a large percentage (e.g., 99.7%) of the possible locations where the moving obstacle may move to. This may allow the ADV to determine and/or plan a path for the ADV that avoids the predicted area. When the ADV avoids the predicted area (where the moving obstacle may move to), this allows the ADV to increase the probability of avoiding a collision with the moving obstacle.

Figure 1:
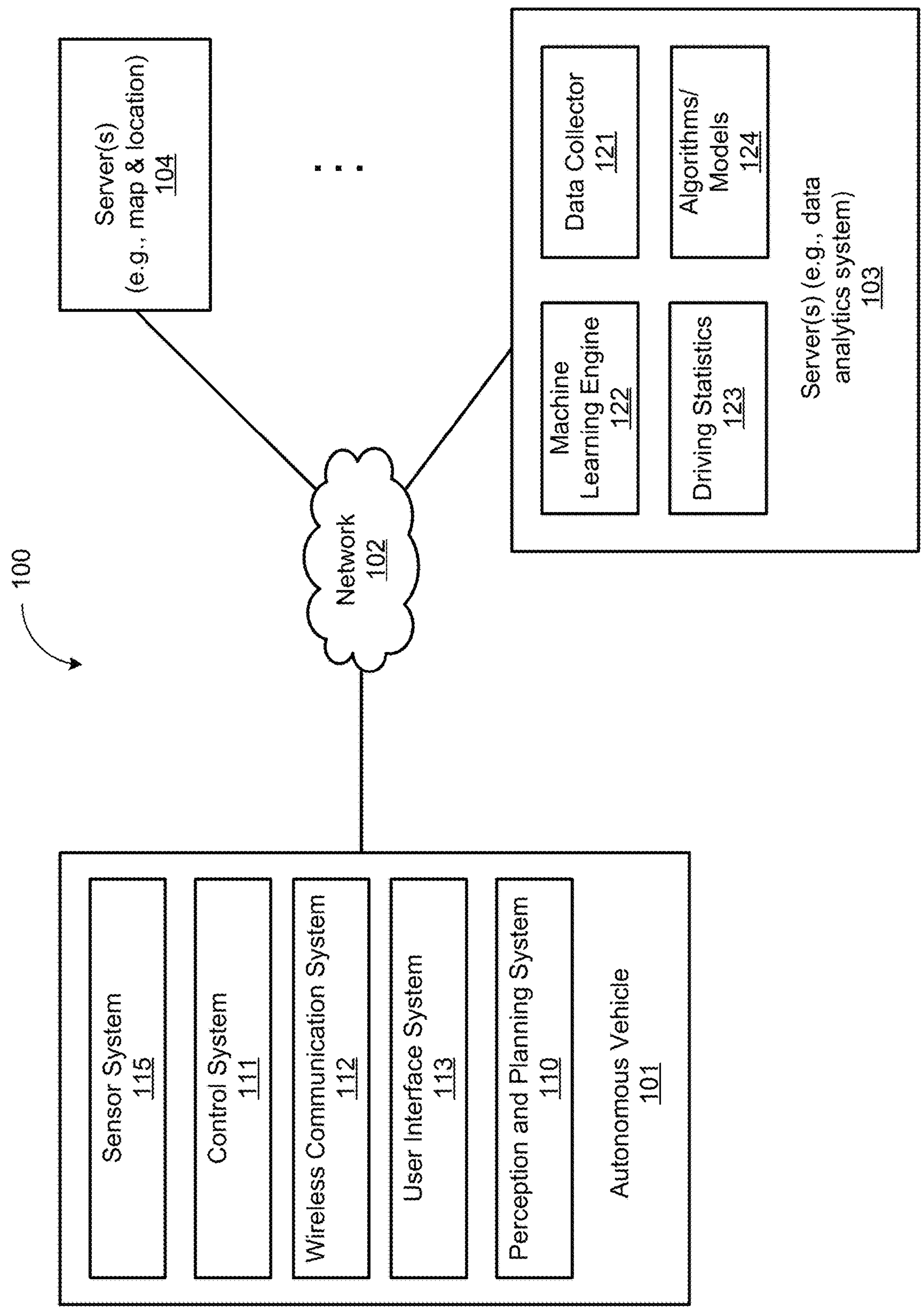
FIG. 1 is a block diagram illustrating a networked system according to some embodiments.

FIG. 1 is a block diagram illustrating an autonomous vehicle network configuration according to some embodiments of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles may be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that may be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
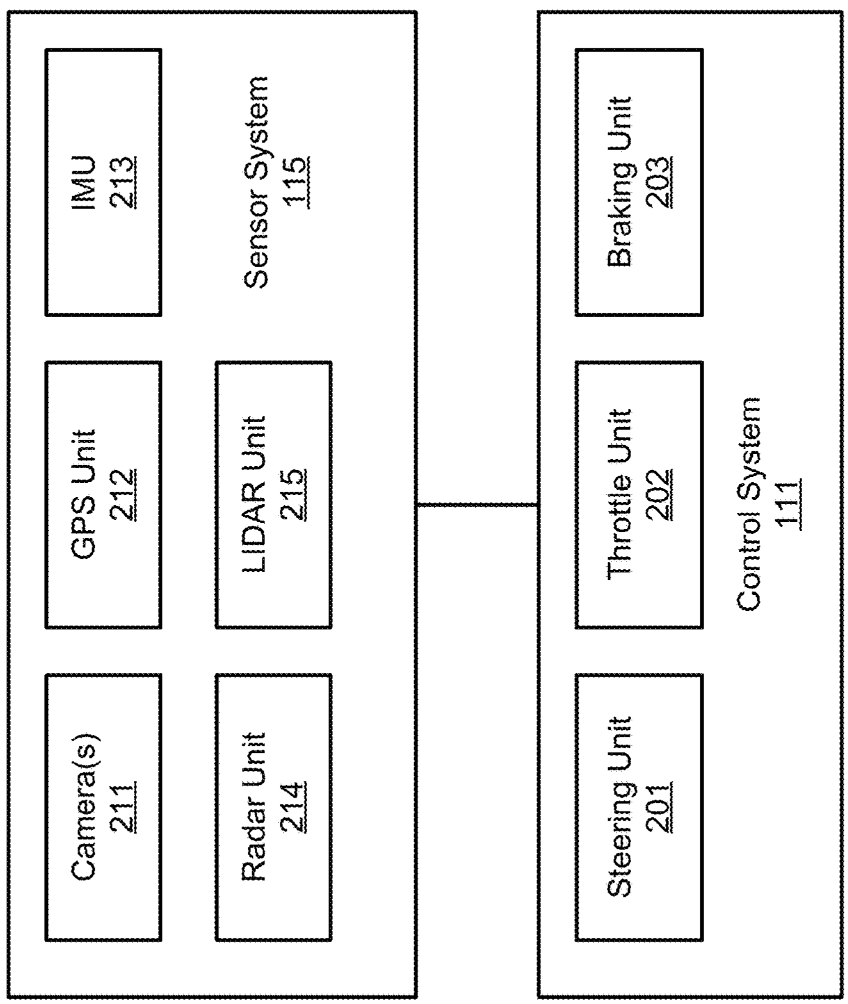
FIG. 2 is a block diagram illustrating an example of an autonomous vehicle according to some embodiments.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110. In some embodiments, the perception and planning system 110 may not have MPOI information (e.g., map data). For example, the perception and planning system 110 may not have map data for other environments or geographical areas/locations, the perception and planning system 110 may not have map data for an environment or geographical area/location where the autonomous vehicle 101 is currently travelling or located (e.g., the perception and planning system 110 may have map data for one city but may not have map data for another city). In another example, the perception and planning system 110 may not have any map data or MPOI information (e.g., the perception and planning system 110 may not store any map data).

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. For example, a set of quintic polynomial functions may be selected and defined with initial coefficients or parameters. Furthermore, a set of constraints may also be defined based on the hardware characteristics such as sensors specification and specific vehicle designs, which may obtained from the driving statistics 123.

Figure 3A:
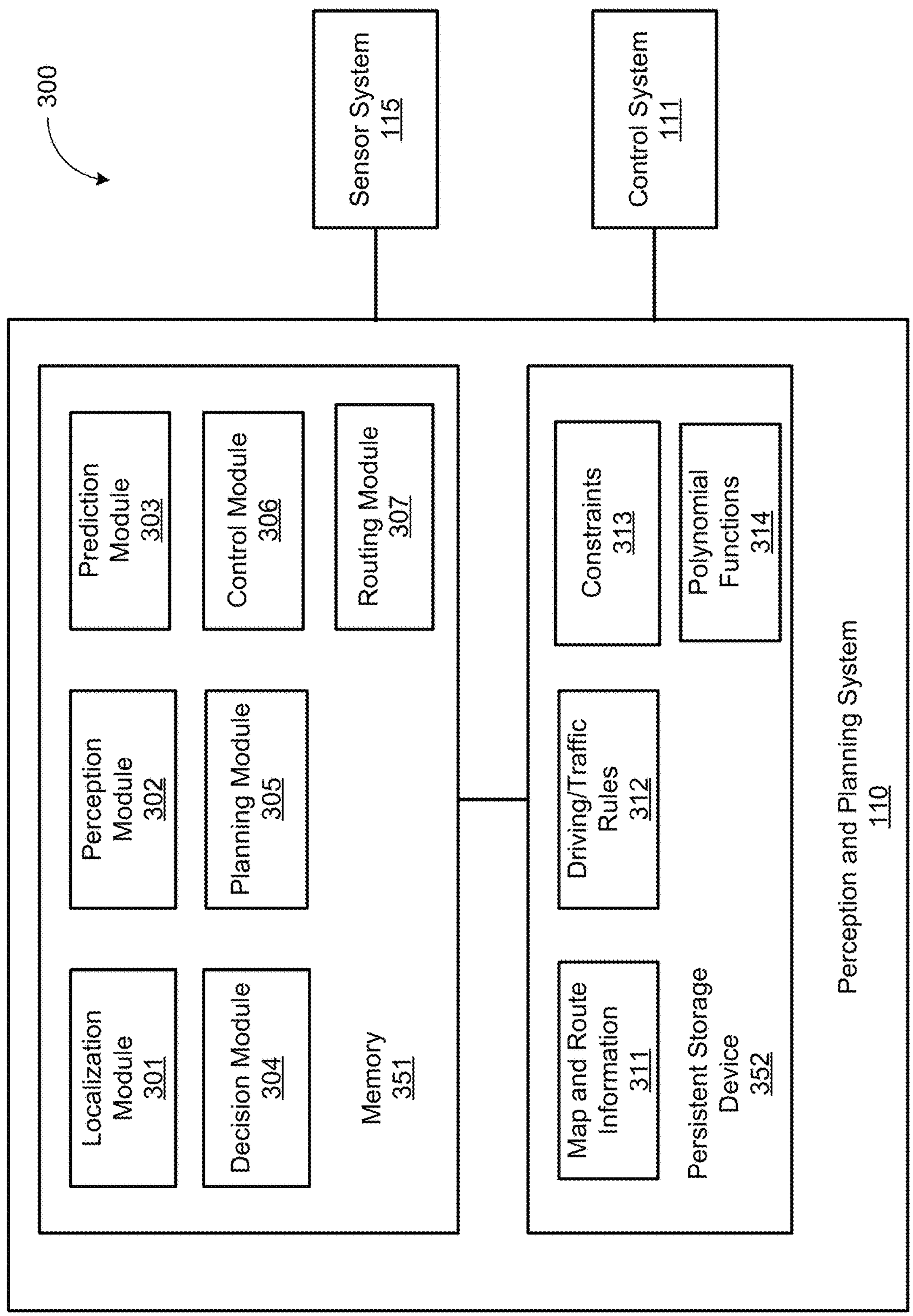
FIGS. 3A-3B are block diagrams illustrating an example of a perception and planning system used with an autonomous vehicle according to some embodiments.
Figure 3B:
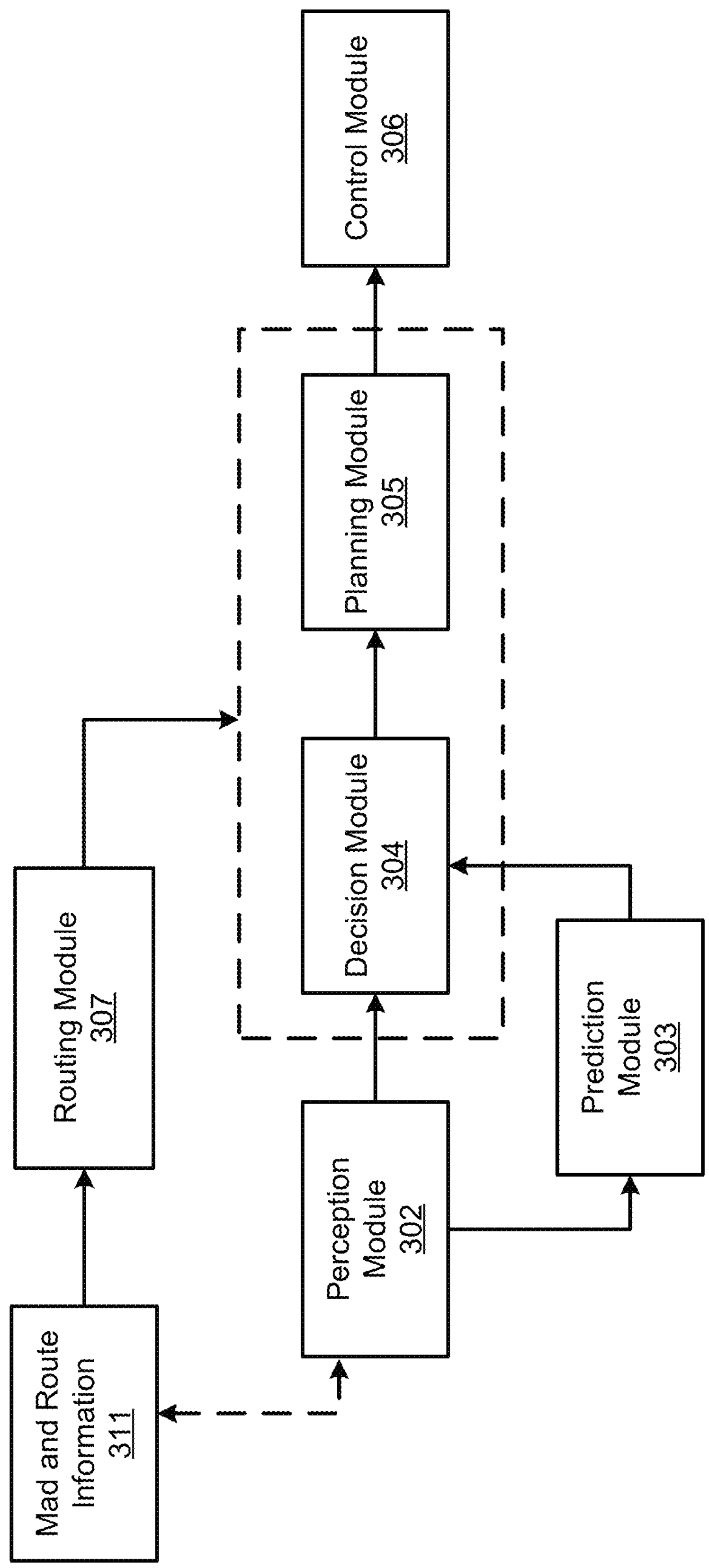

FIGS. 3A and 3B are block diagrams illustrating an example of a perception and planning system used with an autonomous vehicle according to some embodiments. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, and routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server. In one embodiment, the map and route information 311 may have been previously stored in the persistent storage device 352. For example, the map and route information 311 may have been previously downloaded or copied to the persistent storage device 352.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/route information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively. In some embodiments, the map/route information 311 for an environment or geographical area/location may be generated on the fly (e.g., generated by the perception module 302) as the autonomous vehicle travels through the environment or geographical area/location, as discussed in more detail below.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Various moving obstacles/objects may move unpredictably. For example, although a pedestrian may be moving along a path, the pedestrian may suddenly change direction (e.g., turn left) or may accelerate/decelerate. This may cause problems when attempting to predict the path of the moving object in order to avoid colliding with, hitting, or striking the moving object. Thus, it may be useful to determine (e.g., calculate, compute, obtain, etc.) an area that includes possible locations where a moving obstacle may move to. This may allow the ADV to increase the probability of avoiding the moving obstacle.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. In some embodiments, the map/route information 311 may be generated by the perception module 302, as discussed in more detail below. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

In one embodiment, the planning phase is performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps (which may be generated by the perception module 302 or may have been previously stored/downloaded) so as to determine the driving path for the autonomous vehicle.

Decision module 304/planning module 305 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc., in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

Routing module 307 can generate reference routes, for example, from map information such as information of road segments, vehicular lanes of road segments, and distances from lanes to curb. For example, a road may be divided into sections or segments {A, B, and C} to denote three road segments. Three lanes of road segment A may be enumerated {A1, A2, and A3}. A reference route is generated by generating reference points along the reference route. For example, for a vehicular lane, routing module 307 can connect midpoints of two opposing curbs or extremities of the vehicular lane provided by a map data (which may be generated by the perception module 302 or may have been previously stored/downloaded). Based on the midpoints and machine learning data representing collected data points of vehicles previously driven on the vehicular lane at different points in time, routing module 307 can calculate the reference points by selecting a subset of the collected data points within a predetermined proximity of the vehicular lane and applying a smoothing function to the midpoints in view of the subset of collected data points.

Based on reference points or lane reference points, routing module 307 may generate a reference line by interpolating the reference points such that the generated reference line is used as a reference line for controlling ADVs on the vehicular lane. In some embodiments, a reference points table and a road segments table representing the reference lines are downloaded in real-time to ADVs such that the ADVs can generate reference lines based on the ADVs' geographical location and driving direction. For example, in one embodiment, an ADV can generate a reference line by requesting routing service for a path segment by a path segment identifier representing an upcoming road section ahead and/or based on the ADV's GPS location. Based on a path segment identifier, a routing service can return to the ADV reference points table containing reference points for all lanes of road segments of interest. ADV can look up reference points for a lane for a path segment to generate a reference line for controlling the ADV on the vehicular lane.

Figure 4A:
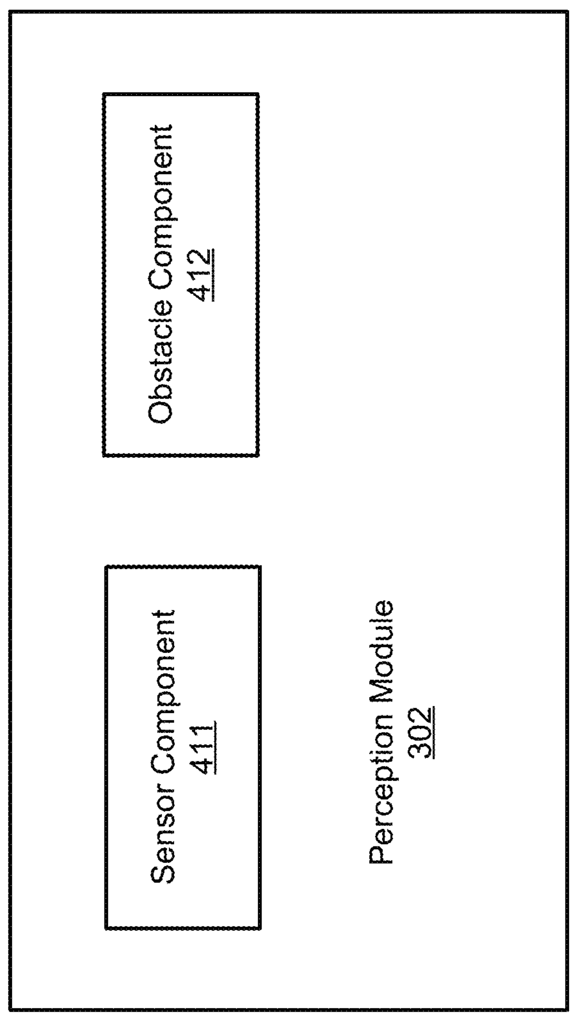
FIG. 4A is a block diagram illustrating an example of a perception module according to some embodiments.

FIG. 4A is a block diagram illustrating an example of a perception module 302 according to some embodiments. Referring to FIG. 4A, perception module 302 includes, but is not limited to, a sensor component 411 and an obstacle component 412. These components 411 through 412 may be implemented in software, hardware, or a combination thereof. The sensor component 411 may obtain sensor data from one or more sensors of an ADV. For example, the sensor component 411 may periodically request or poll for sensor data from the one or more sensors (e.g., may request sensor data from a sensor every few milliseconds, every second, or some other appropriate period of time). In another example, the sensor component 411 may listen or wait for sensor data to be received from the one or more sensors. For example, the sensor component 411 may be configured to constantly monitor buses, communication channels (wired or wireless), wires, lines, pins, traces, etc., so that the sensor component 411 is able to receive sensor data as soon as the sensor data is generated by the one or more sensors.

In one embodiment a sensor may be a camera (e.g., a digital camera, a video camera, a video recorder, etc.) or some other device that is capable of capturing or recording images. The sensor data generated by the camera and received by the sensor component 411 may be referred to as video data. Examples of video data may include but are not limited to digital images (e.g., Joint Photographic Experts Group (JPEG) images), video frames, Motion Picture Experts Group (MPEG) data, or other data that is appropriate for representing optical images captured by the camera. In another embodiment, a sensor may be a radar unit (e.g., radar unit 214 illustrated in FIG. 2) or some other device that is capable of determining the location, range, angle, and/or velocity of objects around the ADV using radio waves (e.g., radio-frequency waves or signals). The sensor data generated by the radar unit may be referred to as radar data. Radar data may be data that may indicate the location, range, angle, and/or velocity of objects detected by the radar unit. In a further embodiment, a sensor may be a LIDAR unit (e.g., LIDAR unit 215 illustrated in FIG. 2) or some other device that is capable of determining the location, range, angle, and/or velocity of objects around the ADV using light (e.g., laser light). The sensor data generated by the LIDAR unit may be data that may indicate the location, range, angle, and/or velocity of objects detected by the LIDAR unit. In other embodiments, other types of sensors may generate other types of sensor data which may be provided do the sensor component 111. Any type of sensor that may be used to detect the location, range, angle, and/or velocity of objects (e.g., pedestrians, vehicles, barricades, obstacles, barriers, lane lines, signs, traffic lights, etc.) in the environment or geographical location/area may be used in the embodiments, implementations, and/or examples described here. In another embodiment, a sensor may be a GPS receiver or unit (e.g., GPS unit 212 illustrated in FIG. 2) or some other device capable to determining the location (e.g., physical or geographical location) of the ADV. The sensor data generated by the GPS receiver may be GPS data (which may be referred to as GPS coordinates).

In one embodiment, the sensor data may indicate information about the environment or geographical area/location in which the ADV is currently located or travelling. For example, the sensor data may indicate the locations and/or layouts of objects (e.g., pedestrians, vehicles, barricades, obstacles, barriers, lane lines, signs, traffic lights, etc.). In another example, the sensor data may indicate road conditions for the environment or geographical area (e.g., whether the road is a dry road, wet road, smooth road, bumpy road, etc.). In a further example, the sensor data may indicate weather conditions for the environment or geographical area (e.g., the temperature, whether there is rain, wind, snow, hail, etc.).

In one embodiment, the obstacle component 412 may detect one or more moving obstacles based on the sensor data obtained/received by the sensor component 411. For example, the obstacle component 412 may analyze the images or video (e.g., video data) captured by the camera to identify moving obstacles that are in the geographical area where the ADV is located/travelling. In another example, obstacle map component 412 may analyze radar data to identify moving obstacles that are in the geographical area where the ADV is located/travelling. In a further example, the obstacle component 412 may analyze LIDAR data to identify moving obstacles that are in the geographical area where the ADV is located/travelling.

In one embodiment, the map component 412 may use various techniques, methods, algorithms, operations, etc., to generate the identifying moving obstacles based on the sensor data. For example, the map component 412 may use image or video processing/analysis techniques or algorithms to identify moving obstacles based on the video data. In another example, the map component 412 may use various object detection techniques or algorithms identify moving obstacles based on radar and/or LIDAR data. The examples, implementations, and/or embodiments described may use various types of sensor data and/or various functions, techniques, methods, algorithms, operations, etc., to identify moving obstacles. For example, the map component 412 may use machine learning, artificial intelligence, statistical models, neural networks, clustering techniques, etc.

Figure 4B:
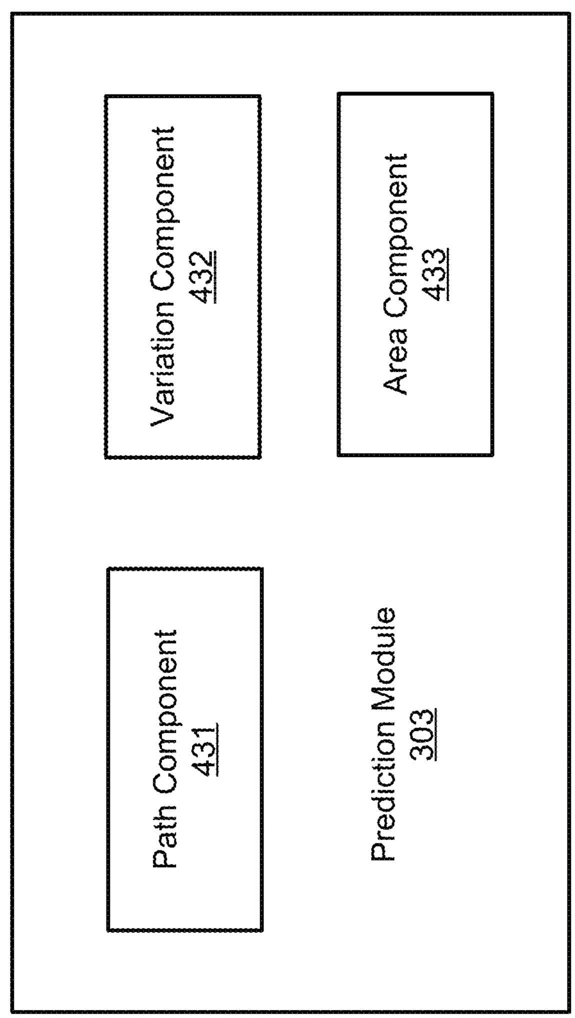
FIG. 4B is a block diagram illustrating an example of a prediction module according to some embodiments.

FIG. 4B is a block diagram illustrating an example of a prediction module 303 according to some embodiments. Referring to FIG. 4B, the prediction module 303 includes, but is not limited to, a path component 431, a variation component 432, and an area component 433. These modules 431-433 may be implemented in software, hardware, or a combination thereof. Reference line generator 435 is configured to generate a reference line for the ADV. As discussed above, the perception module 302 (illustrated in FIGS. 3A, 3B, and 4A) may detect a moving obstacle within a geographical area where the ADV is located. For example, the perception module 302 may detect a pedestrian that is walking in a street/road where the ADV is located/travelling. In another example, the perception module 302 may detect a bicyclist that is riding in a street/road where the ADV is located/travelling. The perception module 302 may detect a moving obstacle based on the sensor data (e.g., video data, radar data, LIDAR data, etc.) generated by one or more sensors (e.g., a video camera, a radar unit, a LIDAR unit, etc.), as discussed above.

In one embodiment, the path component 431 may determine a path for a moving obstacle. As discussed above, the perception module 302 may detect a moving obstacle (e.g., a pedestrian, a bicyclist, etc.) geographical area where the ADV is located/travelling, based on sensor data. The path component 431 may determine a path that the moving obstacle may travel on or take based on the sensor data. The path that the moving obstacle may travel may be referred to as a predicted path, an estimated path, a possible path, etc.

In one embodiment, the path component 431 may determine the predicted path for a moving obstacle by determining a set or a plurality of predicted points in the geographical area with the ADV is located/travelling. For example, the path component 431 may use a Kalman filter to determine the set/plurality of predicted points. A Kalman filter may use a series of measurements observed over time to produces estimates or predictions of unknown variables. A Kalman filter may also estimate a joint probability distribution over the variables for each timeframe. A Kalman filter may be referred to as a linear quadratic estimation (LQE). Although the present disclosure may refer to a Kalman filter, various other filters, algorithms, methods, functions, operations, processes, etc., may be used to determine the set/plurality of predicted points in other embodiments.

In one embodiment, the path component 431 may define and/or generate one or more polynomial functions (e.g., a quintic polynomial, a cubic polynomial, etc.) to represent or model the predicted path of the moving obstacle. For example, a polynomial function may define a line on an X-Y plane that includes the predicted points (e.g., the predict points are on the line defined by the polynomial function and the line represents the predicted path). The one or more polynomial functions may also be generated, determined, calculated based on various boundaries or constraints. The boundaries or constraints may be preconfigured and/or stored as a part of constraints 313 illustrated in FIG. 3A. The polynomial functions used by the path component 431 may be preconfigured and/or stored as a part of functions polynomial functions 314 illustrated in FIG. 3A.

In one embodiment, the area component 433 may determine a predicted area based the predicted path (which was determined by the path component 431) for the ADV. The area component 433 may determine the predicted area based on one or more predicted points, as discussed in more detail below. For example, the area component 433 may determine an area surrounding the predicted path. As discussed above, the motion of a moving obstacle may be unpredictable or uncertain. For example, a pedestrian that is walking in a geographical area (where the ADV is located/travelling) may accelerate (e.g., walk faster), decelerate (e.g., walk slower), or may change direction (e.g., turn left, turn right, turn around, etc.).

In one embodiment, the area component 433 may determining the predicted area based on a plurality of surrounding areas determined by the variation component 432. The variation component 432 may determine a surrounding area for each of the predicted points determined (e.g., obtained, calculated, generated, etc.) by the path component 431, as discussed in more detail below. For example, the variation component 432 may determine a surrounding area for each of the predicted points generated by the path component 431. Each surrounding area may be determined based on a threshold standard deviation from a respective predicted point. For example, the size (e.g., the length, width, etc.) of a surrounding area may be equal to three standard deviations from a respective predicted point. The surrounding area may be referred to as an X-sigma (X-σ) area, where X is the number of standard deviations from the respective predicted point. For example, if the size (e.g., the length, width, etc.) of the surrounding area is equal to three standard deviations from a respective predicted point, then the surrounding area may be referred to as a 3-sigma (3-σ) area. A 3-σ area may be an area where there is a 99.7% chance (e.g., probability) that the moving obstacle will not move outside the boundaries of the 3-σ area. In some embodiments, the size of the surrounding area may be different if a different number of standard deviations are used. For example, a surrounding area with a size that is equal to two standard deviations from a respective predicted point (which may be referred to as a 2-sigma (2-σ) area) may be smaller than a surrounding area with a size that is equal to three standard deviations from a respective predicted point (e.g., a 3-σ area). A 2-σ area may be an area where there is a 95% chance (e.g., probability) that the moving obstacle will not move outside the boundaries of the 2-σ area.

In one embodiment, the surrounding area determined by the variation component 432 may have a shape (e.g., a geometric shape, a regular shape, an irregular shape, etc.). For example, the surrounding area for a predicted point may have a circular shape (e.g., may be a circle). In another example, the surrounding area for a predicted point may have an ellipsoidal shape (e.g., may be an ellipse). Although the figures and the present disclosure may refer to circles and/or ellipses, other shapes may be used in other embodiments.

In one embodiment, the area component 433 may determine one or more boundary points for the predicted area based on the one or more surrounding areas determined by the variation component 432. For example, the area component 433 may determine one or more boundary points for each surrounding area. The outermost edges of the surrounding areas may be encompassed within the boundary points when the boundary points are connected to form a predicted area. The area component 433 may determine the predicted area based on the boundary points. For example, the predicted area may be encompassed by the boundary points. In another example, the boundary points may define the edges or boundaries of the predicted area. In some embodiments, the predicted path may be within the predicted area. For example, the predicted path may be in a center area or region of the predicted area. In another example, the predicted area may encompass or enclose the predicated path.

In some embodiments, the predicted area may include or encompass likely locations where the moving obstacle may move to. For example, the moving obstacle may be a pedestrian. A pedestrian may move unpredictably while moving/travelling through a geographical area. Based on the threshold standard deviation of the surrounding areas that are used to determine the predicted area, the predicted area may encompass a percentage of the possible locations that the pedestrian may move to. For example, if 3-sigma (3-σ) surrounding areas are used to determine the predicted area, then the predicted area may encompasses 99.7% of the possible locations that the pedestrian may move to. Thus, if the ADV avoids the predicted area, the ADV may have a 99.7% change of avoiding (e.g., not hitting the moving obstacle). This may allow the ADV to account, plan, prepare, etc., for the uncertainty or unpredictability of the movement of a moving obstacle.

Figure 4C:
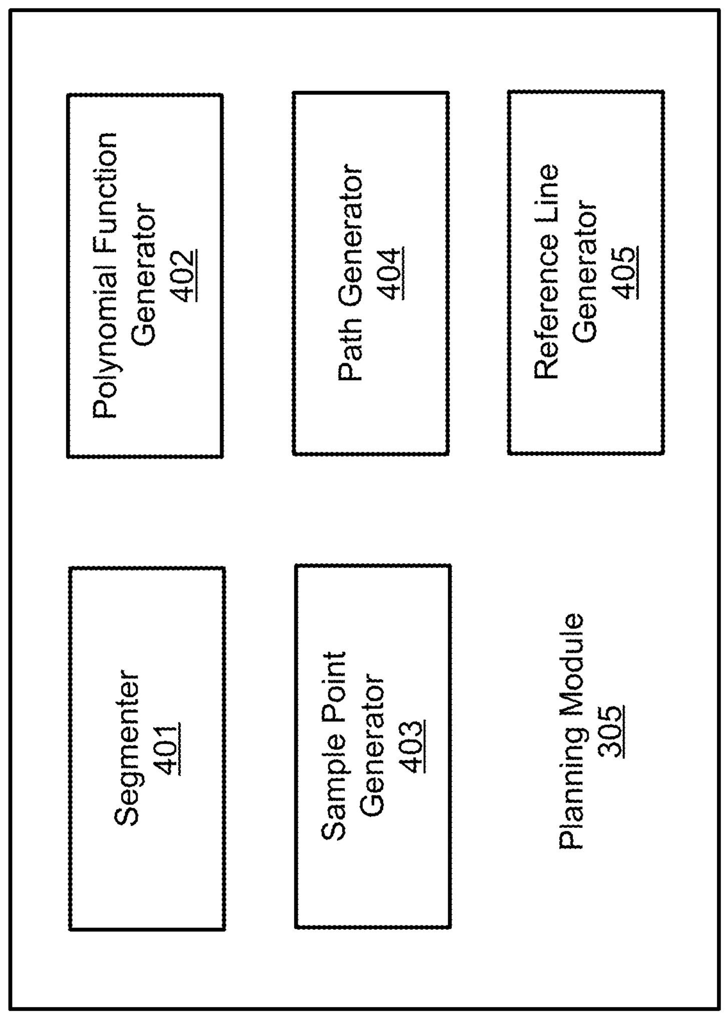
FIG. 4C is a block diagram illustrating an example of a planning module according to some embodiments.

FIG. 4C is a block diagram illustrating an example of a planning module 305 according to some embodiments. Referring to FIG. 4C, planning module 305 includes, but is not limited to, a segmenter 401, a polynomial function generator 402, a sample point generator 403, a path generator 404, and a reference line generator 405. These modules 401-405 may be implemented in software, hardware, or a combination thereof. Reference line generator 405 is configured to generate a reference line for the ADV. As discussed above, the reference line may be a guidance path, e.g., a center line of a road, for the ADV, to generate stable trajectories. The reference line generator 405 may generate the reference line based on map and route information 311 (illustrated in FIGS. 3A and 3B). As discussed above, the map and route information 311 may be preexisting map data (e.g., map data that was previously downloaded or stored). In one embodiment, the reference line generator 405 may generate the reference line based on a predicated area and/or a predicted path determined (e.g., generated, calculated, computed, etc.) by the prediction module 303. The reference line generator 405 may generate a reference line that avoids the predicted area and/or the predicted path. For example, when represented on an X-Y plane, the reference line may not cross over/through the predicted area and/or the predicted path.

Segmenter 401 is configured to segment the reference line into a number of reference line segments. The reference line may be divided into reference line segments to generate discrete segments or portions of the reference line. For each of the reference line segments, polynomial function generator 402 may be configured to define and generate a polynomial function to represent or model the corresponding reference line segment. The sample point generator 403 may generate sample points based on the reference line. For example, the sample point generator 403 may generate one or more sets of sample points (e.g., groups of one or more sample points) that are may generally follow the reference line, as discussed in more detail below. In one embodiment, the sample point generator 40 may generate the one or more sets of sample points based on a predicated area and/or a predicted path determined (e.g., generated, calculated, computed, etc.) by the prediction module 303. The sample point generator 403 may generate sets of sample points that avoid the predicted area and/or the predicted path. For example, when represented on an X-Y plane, the sets of sample points may not be located within the predicted area and/or may not be located on the predicted path.

The polynomial function generator 402 may connect the multiple sets of sample points to each other. For example, the polynomial function generator 402 may generate one or more segments (e.g., connections) between each sample point in a set of sample points and each sample in the next adjacent set of sample points, as discussed in more detail below. The polynomial function generator 402 may also generate, calculate, determine, etc., one or more polynomials that may be used to represent the segments between the sample points. For example, the polynomial function generator 402 may generate, determine, calculate, etc., a polynomial function for each segment between two sample points. The polynomial functions that represent the segments may also be generated, determined, calculated based on various boundaries or constraints. The boundaries or constraints may be preconfigured and/or stored as a part of constraints 313 illustrated in FIG. 3A. The polynomial functions used by the planning module 305 (e.g., used by the polynomial function generator 402) may be preconfigured and/or stored as a part of functions polynomial functions 314 illustrated in FIG. 3A.

The path generator 404 may determine a path for the ADV based on the segments between the sample points, as discussed in more detail below. For example, the path generator 404 may determine a cost for each segment. The cost may be based on various factors or parameters including, but not limited to, how far away the segment is from the reference line, how far away the sample points in the segment are from the reference line, the curvature change rate for a segment or for sample points in the segment, the curvature of a segment, obstacles (e.g., a vehicle, a pedestrian, an obstruction, etc.) that may be located at a sample point, etc. The costs may also be referred to as weights. The path generator 404 may identify or select the segments that form a path which has the lowest total cost (lowest total weight).

Figure 5A:
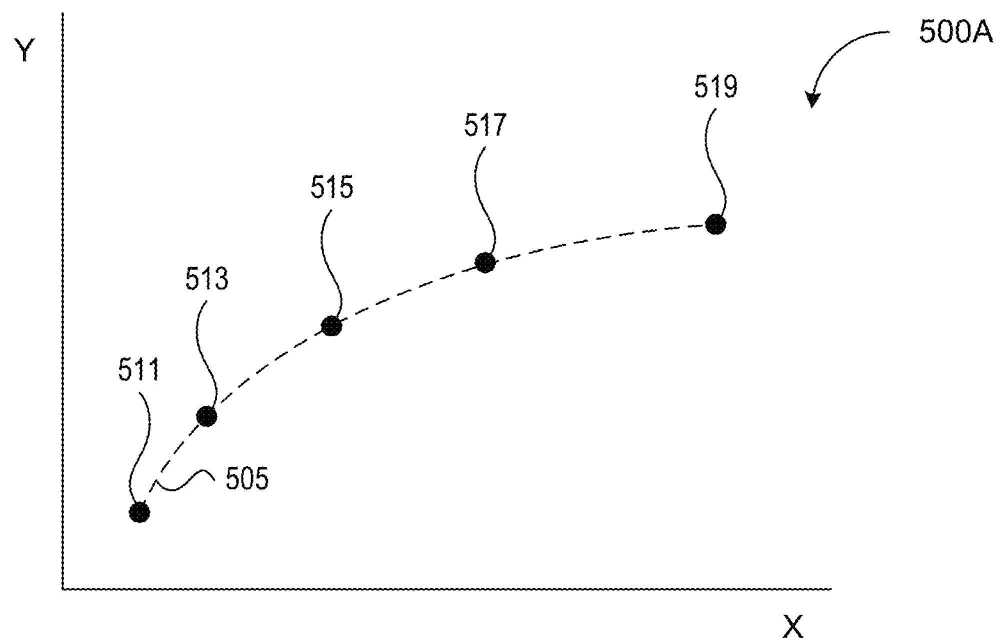
FIG. 5A is a diagram illustrating an example graph according to some embodiments.

FIG. 5A is a diagram illustrating an example graph 500A according to some embodiments. The graph 500A may represent an X-Y plane using a Cartesian coordinate system, as illustrated by the X-axis and Y-axis in FIG. 5A. For example, the location of a point on the graph 500A may be represented using an X-Y coordinate. In another example, a line and/or an area on the graph 500A may be represented using one or more equations/functions (e.g., a liner function, a cubic polynomial, a quintic polynomial, etc.). As discussed above, an ADV (e.g., perception module 302 illustrated in FIGS. 3A, 3B, and 4A) may detect a moving obstacle within a geographical area where the ADV is located. For example, the ADV may detect a pedestrian that is walking/running in a street/road (e.g., a geographical area) where the ADV is located/travelling, based on sensor data. As illustrated in FIG. 5A, the ADV (e.g., prediction module 302 illustrated in FIG. 3B, path component 431 illustrated in FIG. 4B, etc.) may determine a path that the moving obstacle may travel on or take based on the sensor data. The path that the moving obstacle may travel may be referred to as a predicted path, an estimated path, a possible path, etc. The predicted path of the moving obstacle (e.g., a pedestrian) is represented by line 505. The line 505 (e.g., the predicted path of the moving obstacle) includes points 511, 513, 515, 517, and 519 (e.g., points 511, 513, 515, 517, and 519 are located or lie on the 505). The points 511, 513, 515, and 517 may be referred to as predicted points.

In one embodiment, the ADV may determine the line 505 (e.g., the predict path of the moving obstacle) and/or the points 511, 513, 515, 517, and 519 (e.g., predicted points) using a Kalman filter, as discussed above. Although the present disclosure may refer to a Kalman filter, various other filters, algorithms, methods, functions, operations, processes, etc., may be used to determine the set/plurality of predicted points in other embodiments. The line 505 may be represented based on functions/equations, such as linear functions, polynomial functions (e.g., cubic polynomials, quintic polynomials, etc.), as discussed above.

Figure 5B:
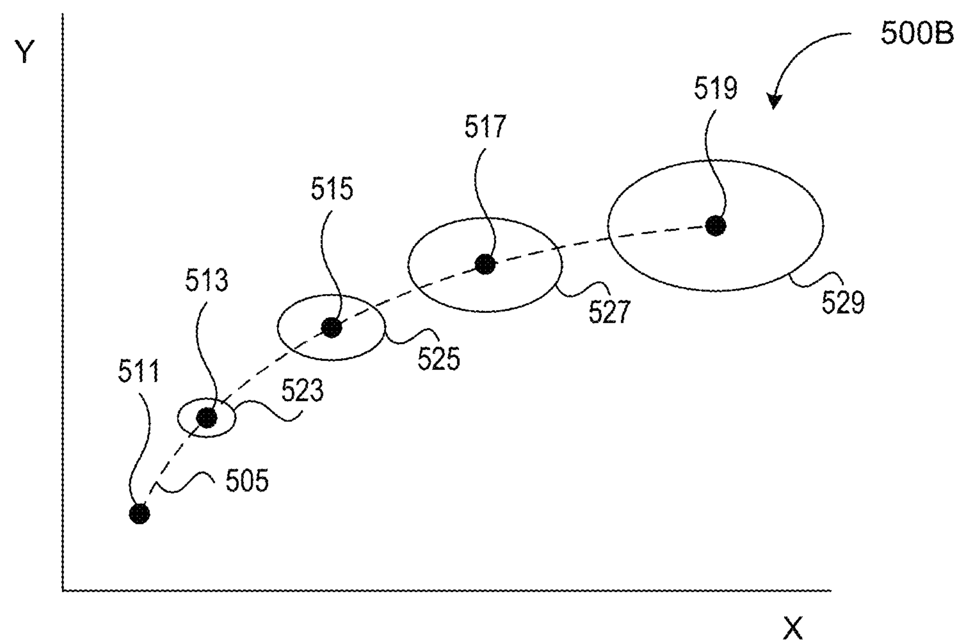
FIG. 5B is a diagram illustrating an example graph according to some embodiments.

FIG. 5B is a diagram illustrating an example graph 500B according to some embodiments. As discussed above, the graph 500B may represent an X-Y plane using a Cartesian coordinate system, as illustrated by the X-axis and Y-axis in FIG. 5B. Also as discussed above, an ADV may detect a moving obstacle (e.g., a pedestrian, a bicyclist, etc.) within a geographical area (e.g., a road, a street, etc.) where the ADV is located. As illustrated in FIG. 5B, the ADV may determine a path that the moving obstacle may travel on or take based on the sensor data. The path that the moving obstacle may travel may be referred to as a predicted path, an estimated path, a possible path, etc. The predicted path of the moving obstacle (e.g., a pedestrian) is represented by line 505. The line 505 (e.g., the predicted path of the moving obstacle) includes points 511, 513, 515, 517, and 519 (e.g., points 511, 513, 515, 517, and 519 are located or lie on the 505). The points 511, 513, 515, and 517 may be referred to as predicted points.

In one embodiment, the ADV (e.g., prediction module 302 illustrated in FIG. 3B, variation component 432 illustrated in FIG. 4B, etc.) may determine surrounding areas 523, 525, 527, and 529 (represented by the ellipses in FIG. 5B) based on the points 511, 513, 515, 517, and 519 (e.g., based on one or more predicted points). For example, the ADV may determine surrounding area 523 for point 513, may determine surrounding area 525 for point 515, may determine surrounding area 527 for point 517, and may determine surrounding area 529 for point 519.

Although the surrounding areas 523, 525, 527, and 529 are illustrated as ellipses, the surrounding areas 523, 525, 527, and 529 may have other shapes in other embodiments. For example, the surrounding area for a predicted point may have a circular shape (e.g., may be a circle). In another example, the surrounding area for a predicted point may have an ellipsoidal shape (e.g., may be an ellipse). Although the figures and the present disclosure may refer to circles and/or ellipses, other shapes may be used in other embodiments. In some embodiments, the length and width of the surrounding areas 523, 525, 527, and 529 may be based on the overall path (represented by line 505) of the moving obstacle. For example, line 505 has more distance along than X-axis than the Y-axis (e.g., the length of the line is more than the width of the line). Thus, the length of the surrounding areas 523, 525, 527, and 529 (e.g., the length of the ellipses) may be more than the width of the surrounding areas 523, 525, 527, and 529 (e.g., the width of the ellipses). In another example, if a line is near or close to a 45° angle, (e.g., the length of the line is substantially equal to the width of the line), the length and width of the surrounding areas may be equal (e.g., the surrounding areas may have circular shape, rather than an ellipsoidal shape).

In one embodiment, each of surrounding areas 523, 525, 527, and 529 may be determined based on a threshold standard deviation from a respective predicted point. For example, length and width of surrounding area 517 may be equal to a threshold number of standard deviations from point 517. As discussed above, surrounding areas 523, 525, 527, and 529 may be referred to as an X-sigma (X-σ) areas, where X is the number of standard deviations from the respective predicted point (e.g., a 3-sigma (3-σ) area may indicate that the length and width of the surrounding are three standard deviations from a point. In some embodiments, the surrounding areas 523, 525, 527, and 529 may be 3-sigma (3-σ) areas. A 3-σ area may be an area where there is a 99.7% chance (e.g., probability) that the moving obstacle will not move outside the boundaries of the 3-σ area. In other embodiments, the surrounding areas 523, 525, 527, and 529 may be different X-sigma areas. For example, the surrounding areas 523, 525, 527, and 529 may be 2-sigma (2-σ) areas. In another example, souring area 523 may be a 3-sigma (3-σ) area and surrounding area 529 may be a 2-sigma (2-σ) area.

Figure 5C:
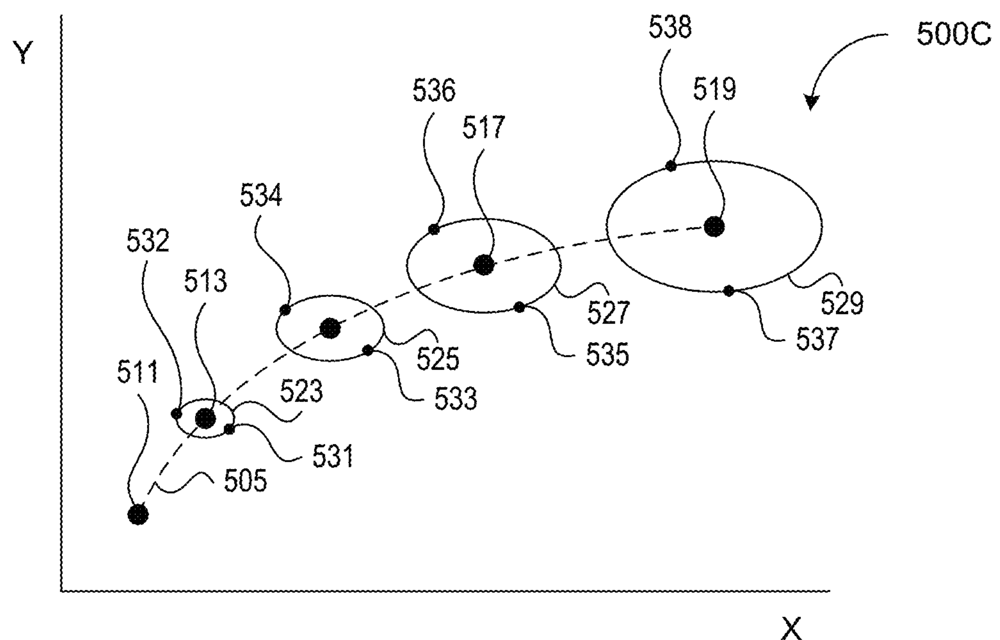
FIG. 5C is a diagram illustrating an example graph according to some embodiments.

FIG. 5C is a diagram illustrating an example graph 500C according to some embodiments. As discussed above, the graph 500C may represent an X-Y plane using a Cartesian coordinate system, as illustrated by the X-axis and Y-axis in FIG. 5C. Also as discussed above, an ADV may detect a moving obstacle (e.g., a pedestrian, a bicyclist, etc.) within a geographical area (e.g., a road, a street, etc.) where the ADV is located. As illustrated in FIG. 5C, the ADV may determine a path that the moving obstacle may travel on or take based on the sensor data. The path that the moving obstacle may travel may be referred to as a predicted path, an estimated path, a possible path, etc. The predicted path of the moving obstacle (e.g., a pedestrian) is represented by line 505. The line 505 (e.g., the predicted path of the moving obstacle) includes points 511, 513, 515, 517, and 519 (e.g., points 511, 513, 515, 517, and 519 are located or lie on the 505). The points 511, 513, 515, and 517 may be referred to as predicted points. Also as illustrated in FIG. 5C, the ADV may determine surrounding areas 523, 525, 527, and 529. Each of surrounding areas 523, 525, 527, and 529 may be determined based on a threshold standard deviation from a respective predicted point, as discussed above. For example, length and width of surrounding area 517 may be equal to a threshold number of standard deviations from point 517.

In one embodiment, the ADV (e.g., prediction module 303 illustrated in FIG. 3B, area component 433 illustrated in FIG. 4B, etc.) may determine one or more boundary points for the predicted area based on the one or more surrounding areas determined by the variation component 432. For example, the ADV may determine boundary points 531 and 532 for surrounding area 523, may determine boundary points 533 and 534 for surrounding area 525, may determine boundary points 535 and 536 for surrounding area 527, and may determine boundary points 537 and 538 for surrounding area 529. In some embodiments, the boundary points 531 through 538 may be determined such that the outermost edges of the surrounding areas 523, 525, 527, and 529 are encompassed within the boundary points when the boundary points are connected to form an area (e.g., a predicted area), as discussed in more detail below.

Figure 5D:
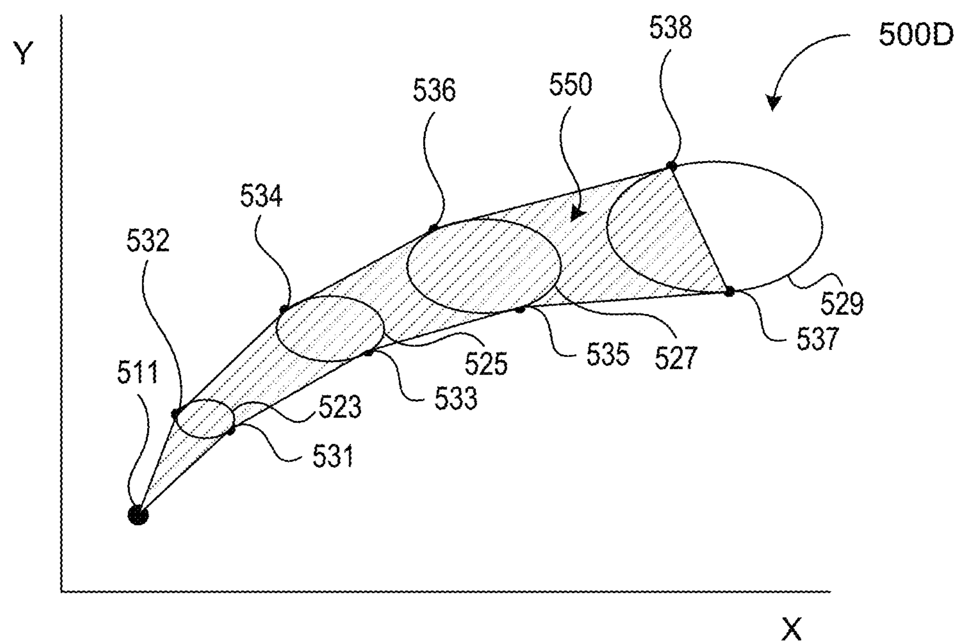
FIG. 5D is a diagram illustrating an example graph according to some embodiments.

FIG. 5D is a diagram illustrating an example graph 500D according to some embodiments. As discussed above, the graph 500D may represent an X-Y plane using a Cartesian coordinate system, as illustrated by the X-axis and Y-axis in FIG. 5D. Also as discussed above, an ADV may detect a moving obstacle (e.g., a pedestrian, a bicyclist, etc.) within a geographical area (e.g., a road, a street, etc.) where the ADV is located. The ADV may determine a path that the moving obstacle may travel on or take based on the sensor data. The path that the moving obstacle may travel may be referred to as a predicted path, an estimated path, a possible path, etc. The ADV may also determine surrounding areas 523, 525, 527, and 529. The ADV may further determine boundary points 531 through 538 based on the surrounding areas 523, 525, 527, and 529.

In one embodiment, the area component 433 may determine a predicted area 550 (illustrated by the shaded area) based on the boundary points 531 through 538. As illustrated, the boundary points 531 through 538 are connected together to form the predicted area 550. For example, point 511 may be connected to boundary points 532 and 531, boundary point 531 is connected to boundary point 533, boundary point 533 is connected to boundary point 535, boundary point 535 is connected to boundary point 537, boundary point 532 is connected to boundary point 534, boundary point 534 is connected to boundary point 536, boundary point 536 is connected to boundary point 538, and boundary point 537 is connected to boundary point 538. The connected points (e.g., point 511 and boundary points 531 through 538) may form the predicted area 550. The boundary points 531 through 538 may be encompassed or included in the predicted area 550. For example, the boundary points 531 through 538 may located around the edges or boundaries of the predicted area 550. The predict path (e.g., line 505) illustrated in FIGS. 5A through 5C may be located within the predicted area 550.

In some embodiments, the predicted area 550 may include or encompass likely locations where the moving obstacle may move to. For example, the moving obstacle may be a pedestrian that may travel along a predicted path (e.g., line 505 illustrated in FIGS. 5A through 5C). Because the moving obstacle (e.g., pedestrian) may move unpredictably while moving/travelling through a geographical area it may be useful to determine an area that includes the possible locations where the moving obstacle may move. Based on the threshold standard deviation of the surrounding areas that are used to determine the predicted area, the predicted area may encompass a percentage of the possible locations that the pedestrian may move to. For example, if each of the surrounding areas 523, 525, 527, and 529 are 3-sigma (3-$\sigma$) surrounding areas, then the predicted area 550 may encompass 99.7% of the possible locations that the pedestrian may move to. Thus, if the ADV avoids the predicted area 550, the ADV may have a 99.7% change of avoiding (e.g., not hitting) the moving obstacle. This may allow the ADV to account, plan, prepare, etc., for the uncertainty or unpredictability of the movement of a moving obstacle. This may also allow the ADV to operate more safely by increasing the chances that the ADV will not collide with, not hit, not strike, etc., the moving obstacle.

Figure 6A:
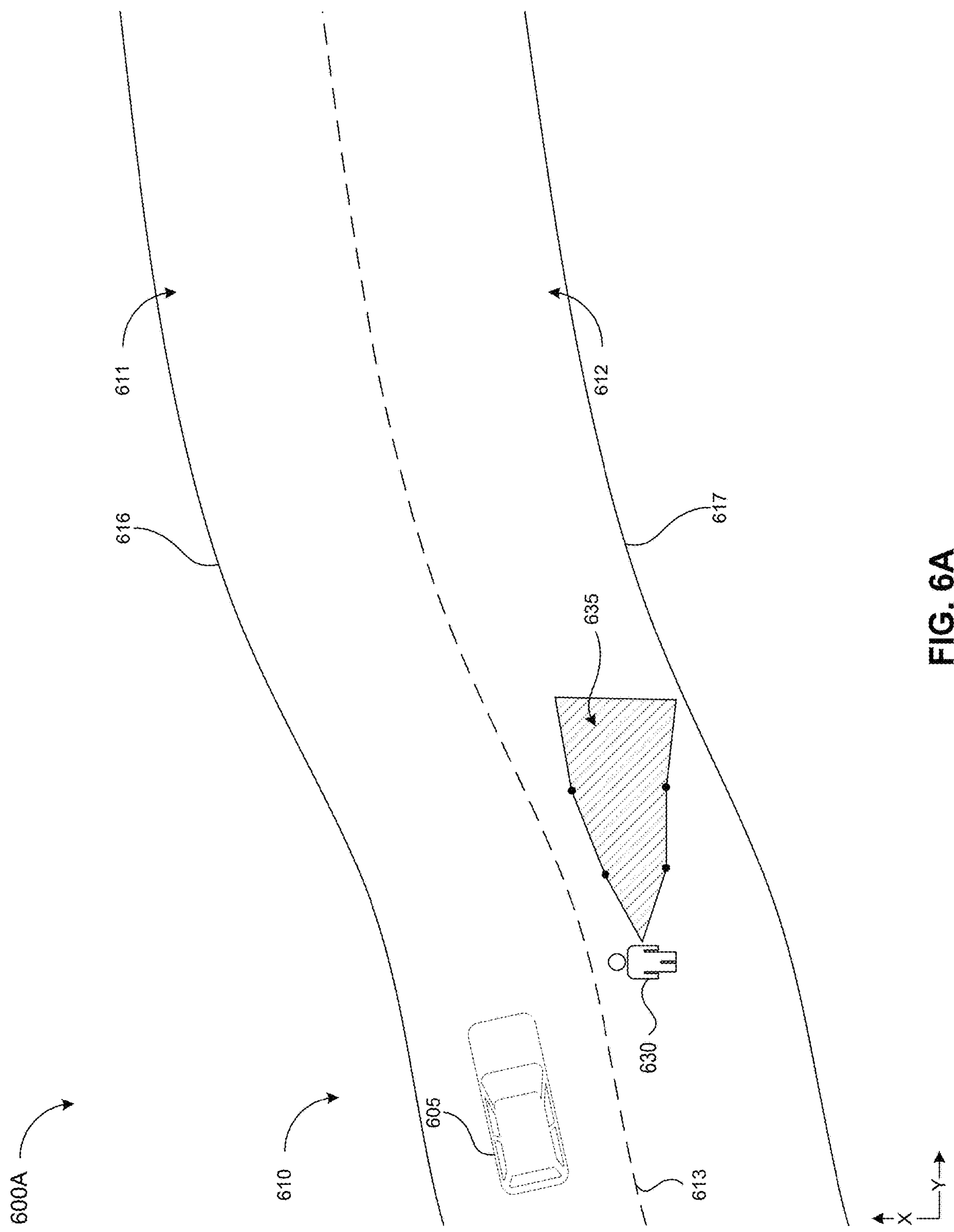
FIG. 6A is a diagram illustrating an example of an autonomous vehicle traveling down a road according to some embodiments.

FIG. 6A is a diagram illustrating an example of an ADV 605 traveling (e.g., moving, driving, etc.) in an environment 600A (e.g., a geographical area/location) according to some embodiments. The environment 600A includes a road 610 (e.g., a street, a lane, a highway, a freeway, an expressway, etc.) and a vehicle 615. The road 610 has two lanes, lane 611 and lane 612. The two lanes are divided by lane line 613 and the boundaries of the road are defined by lane lines 616 and 617. The environment 600A also includes a pedestrian 630 (e.g., a moving obstacle) that is moving (e.g., walking, running, etc.) through the environment 600A. The road 610, the lanes 611, and 612, the lane lines 613, 616, and 617, the location of the ADV 605, the location of the pedestrian 630, and/or other elements illustrated in FIG. 5A may be represented using a Cartesian coordinate system as illustrated by the X-axis and Y-axis in FIG. 5A. For example, the location of the ADV 605 may be represented using an X-Y coordinate.

As discussed above, the ADV 605 may detect and/or identify the pedestrian 630 based on sensor data (e.g., based on video data, radar data, LIDAR data, etc.). The ADV 605 may determine predicted path for the pedestrian 630, as discussed above. The ADV 605 may also determine a plurality of surrounding areas based on points of the predicted path, as discussed above. The ADV 605 may determine a plurality of boundary points for the surrounding areas and may determine the predicted area 635 based on the plurality of boundary points as discussed above.

In some embodiments, the predicted area 635 may include or encompass likely locations where the pedestrian 630 may move to. Because the pedestrian 630 may move unpredictably while moving/travelling through the environment 600A it may be useful to determine an area that includes the possible locations where the moving obstacle may move. If 3-sigma (3-$\sigma$) surrounding areas are used to determine the predicted area 635, then the predicted area 635 may encompasses 99.7% of the possible locations that the pedestrian 630 may move to. Thus, if the ADV avoids the predicted area 635, the ADV may have a 99.7% change of avoiding (e.g., not hitting) the pedestrian 630. This may also allow the ADV to operate more safely by increasing the chances that the ADV will collide with, hit, strike, etc., the moving obstacle.

Figure 6B:
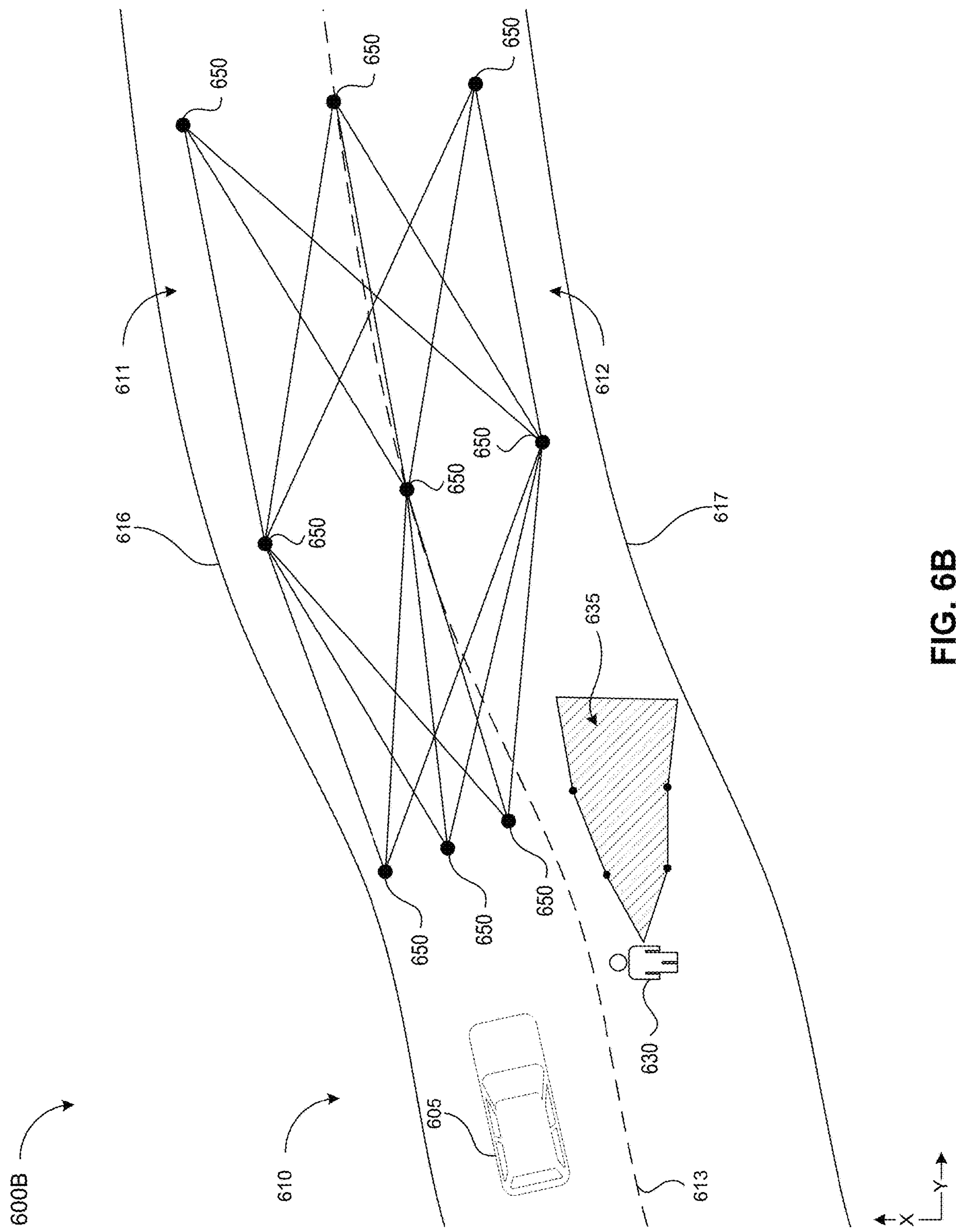
FIG. 6B is a diagram illustrating an example of an autonomous vehicle traveling down a road according to some embodiments.

FIG. 6B is a diagram illustrating an example of an ADV 605 traveling (e.g., moving, driving, etc.) in an environment 600B (e.g., a geographical area/location) according to some embodiments. The environment 600B includes a road 610, lane lines 613, 616, and 617, and a vehicle 615. As discussed above, reference line generator 405 (illustrated in FIG. 4) may generate a reference line. The reference line may be a guidance path, e.g., a center line of the road 610 for the ADV 605. Also as discussed above, segmenter 401 (illustrated in FIG. 4) may segment (e.g., divide, split, etc.) the reference line into reference line segments. The sample point generator 403 may generate sample points 650 (illustrated by the black dots in FIG. 6B), as discussed above. The sample points 650 may be grouped into groups or sets of sample points. As illustrated in FIG. 5B, the sample points 607 are grouped into three sets of sample points. The road 610, the sample points 650, the reference line 630, and/or other elements illustrated in FIG. 5 may be represented using a Cartesian coordinate system as illustrated by the X axis and Y-axis in FIG. 5B. For example, the location of the ADV 605 may be represented using an X-Y coordinate. In another example, a sample point 650 may be represented using an X-Y coordinate. In other embodiments, different numbers of reference line segments, different numbers of sample points, different numbers of sets, different number of sample points in sets, different positions of sample points may be used.

In one embodiment, the reference line may be represented using one or more polynomial functions. For example, the polynomial function generator 402 may generate a polynomial functions that may represent reference line segments. The polynomial function generator 402 may generate one polynomial function for each reference line segment. For each of the reference line segments, polynomial function generator 402 may generate a polynomial function $\theta(s)$. In one embodiment, each polynomial function represents a direction of a starting reference point of the corresponding reference line segment. A derivative (e.g., the first order derivative) of the polynomial function represents a curvature of the starting reference point of the reference line segment, $K=d\theta/ds$. A second order derivative of the polynomial function represents a curvature change or curvature change rate, $dK/ds$.

For the purpose of illustration, following terms are defined:

$\theta_0$: starting direction $\dot{\theta}_0$: starting curvature, $\kappa$, direction derivative w.r.t. curve length, i.e., $$\frac{d\theta}{ds}$$

$\ddot{\theta}_0$: starting curvature derivative, i.e., $$\frac{d\kappa}{ds}$$

$\theta_1$: eliding direction $\dot{\theta}_1$: ending curvature $\ddot{\theta}_1$: ending curvature derivative $\Delta_s$: the curve length between the two ends Each piecewise spiral path is decided by seven parameters: starting direction ($\theta 0$), starting curvature ($d\theta 0$), starting curvature derivative (d2θ0), ending direction (θ1), ending curvature (dθ1), ending curvature derivative (d2θ1) and the curve length between the starting and ending points (Δs). In one embodiment, the polynomial function may be a quintic polynomial function. A quintic polynomial function may be defined by equation (1) (e.g., a formula, a function, etc.) as follows:

$$\theta_i(s)=\alpha*s^5+b*s^4+c*s^3+d*s^2+e*s+f \quad (1)$$

and it satisfies $$\theta_i(0)=\theta_i \quad (2)$$

$$\dot{\theta}_i(0)=\dot{\theta}_i \quad (3)$$

$$\ddot{\theta}_i(0)=\ddot{\theta}_i \quad (4)$$

$$\theta_i(\Delta s)=\theta_{i+1} \quad (5)$$

$$\dot{\theta}_i(\Delta s)=\dot{\theta}_{i+1} \quad (6)$$

$$\ddot{\theta}_i(\Delta s)=\ddot{\theta}_{i+1} \quad (7)$$

In another embodiment, the polynomial function may be a cubic polynomial. A cubic polynomial may be defined by equation (8) as follows:

$$\theta_i(s)=a*s^3+b*s^2+c*s+f \quad (8)$$

and the cubic polynomial may satisfy the same conditions (indicated above with respect to the quintic polynomial function) illustrated by equations (2) through (7).

Based on the above constraints, the optimization is performed on all polynomial functions of all reference line segments, such that the output of a polynomial function representing reference line segment (i) at zero segment length should be the same as or similar to a direction at the starting reference point of the corresponding reference line segment (i). A first order derivative of the polynomial function should be the same as or similar to a curvature at the starting reference point of the reference line segment (i). A second order derivative of the polynomial function should be the same as or similar to a curvature change rate at the starting reference point of the reference line segment (i). Similarly, the output of a polynomial function representing reference line segment (i) at the full segment length (s) should be the same as or similar to a direction at the starting reference point of the next reference line segment (i+1), which is the ending reference point of the current reference line segment (i). A first order derivative of the polynomial function should be the same as or similar to a curvature at the starting reference point of the next reference line segment (i+1). A second order derivative of the polynomial function should be the same as or similar to a curvature change rate at the starting reference point of the next reference line segment (i+1).

For example, for a reference line segment, an output of the corresponding polynomial function θ(0) represents a direction or angle of a starting point of reference line segment. θ(Δs0) represents a direction of ending point of reference line segments, where the ending point of reference line segments is also the starting point of the next reference line segment. A first order derivative of θ(0) represents a curvature at the starting point of reference line segment and a second order derivative of θ(0) represents a curvature change rate at the ending point of reference line segment. A first order derivative of θ(s0) represents a curvature of the ending point of reference line segment and a second order derivative of θ(s0) represents a curvature change rate of the ending point of reference line segment.

By substituting the above variables $\theta_i$, $\dot{\theta}_i$, $\ddot{\theta}_i$, $\theta_{i+1}$, $\dot{\theta}_{i+1}$, $\ddot{\theta}_{i+1}$, Δs in, there will be six equations that may be utilized to solve the coefficients of the polynomial function a, b, c, d, e, and f. For example, as stated above, the direction at a given point may be defined using the above quintic polynomial function:

$$\theta(s)=as^5+bs^4+cs^3+Ds^2+Es+f \quad (9)$$

The first order derivative of the quintic polynomial function represents a curvature at the point of the path:

$$d\theta=5as^4+4bs^3+3cs^2+2ds+e \quad (10)$$

The second order derivative of the quintic polynomial function represents a curvature change rate at the point of the path:

$$d^2\theta=20as^3+12bs^2+6cs+2d \quad (11)$$

For a given spiral path or reference line segment, there are two points involved: a starting point and an ending point, where the direction, curvature, and curvature change rate of each point may be represented by the above three equations respectively. Thus, there are a total of six equations for each spiral path or reference line segment. These six equations may be utilized to determine the coefficients a, b, c, d, e, and f of the corresponding quintic polynomial function.

When a spiral path is utilized to represent a curve between consecutive reference points in the Cartesian space, there is a need to build a connection or bridge between the spiral path curve length and a position in the Cartesian space. Given a spiral path $\theta_i(s)$ defined by $\{\theta_i, d\theta_i, d^2\theta_i, \theta_{i+1}, d\theta_{i+1}, d^2\theta_{i+1}, \Delta s\}$, and path starting point $p_i=(x_i, y_i)$, we need to determine the coordinate of point p=(x, y) given any s=[0, Δs]. In one embodiment, the coordinates of a given point may be obtained based on the following equations (e.g., formulas, functions, etc.):

$$x=x_i+\int_0^s \cos(\theta_i(s))ds \quad (12)$$

$$y=y_i+\int_0^s \sin(\theta_i(s))ds \quad (13)$$

When s=Δs, the ending coordinates pi+1 are obtained given curve θi and starting coordinates pi=(xi, yi). The optimization of the functions are performed such that the overall output of the functions of the spiral paths reach minimum, while the above set of constraints are satisfied. In addition, the coordinates of the terminal point derived from the optimization is required to be within a predetermined range (e.g., tolerance, error margins) with respect to the corresponding coordinates of the initial reference line. That is, the difference between each optimized point and the corresponding point of the initial reference line should be within a predetermined threshold.

In some embodiments, the path generator 404 may use dynamic programming algorithm, functions, operations, etc., to determine the path for the ADV 605. For example, the path generator 404 may use Dijkstra's algorithm to determine the path with the lowest cost for the ADV 605 based on the costs (e.g., the weights) of the segments. The path for the ADV may include one segment of the nine segments between the leftmost set of sample points and the middle set of sample points, and one segment of the nine segments between the middle set of sample points and the rightmost set of sample points. If multiple paths have the same lowest cost, the path generator 404 may select one of the multiple paths based on various factors. For example, the path generator 404 may select the path that most closely follows the reference line (e.g., the path that deviates the least from the reference line).

Figure 7:
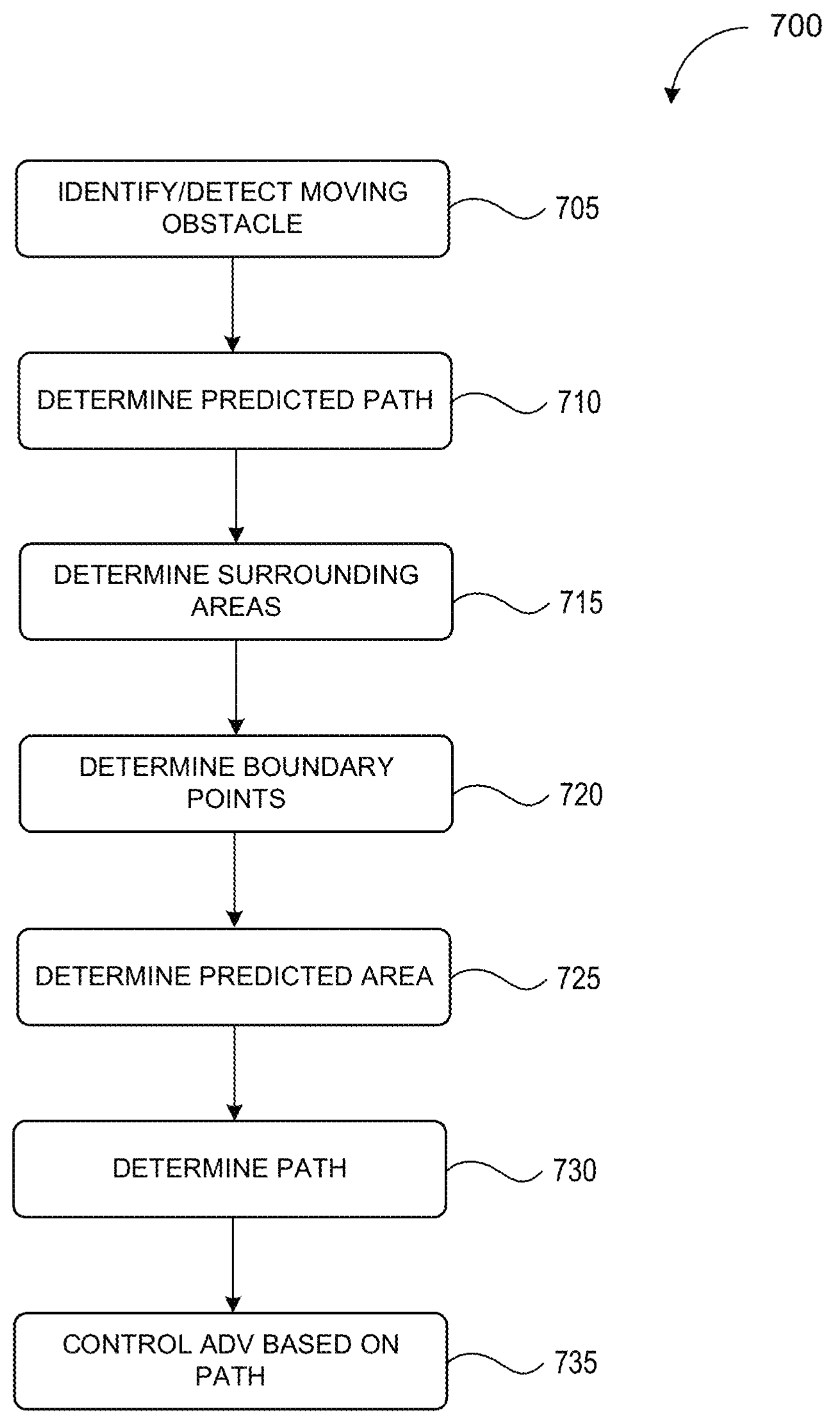
FIG. 7 is a flow diagram illustrating an example of process for determining a path for an autonomous vehicle according to some embodiments.

FIG. 7 is a flow diagram illustrating an example of process 700 for determining a path for an autonomous vehicle (e.g., an ADV) according to some embodiments. Process 700 may be performed by processing logic which may include software, hardware, or a combination thereof. Process 700 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, process 700 may be performed by one or more of perception module 302, prediction module 303, and planning module 305, illustrated in FIG. 3B, FIG. 4A, FIGS. 4B, and 4C. Referring to FIG. 7, at block 705, the processing logic identifies and/or detects a moving obstacle. For example, the processing logic may detect a moving obstacle (e.g., a pedestrian) based on sensor data. AT block 710, the processing logic may determine a predicted path for the moving obstacle. For example, the processing logic may determine one or more points (e.g., predicted points) that represent the predicted path, based on the sensor data.

The processing logic may determine surrounding areas for the predicted points at block 715. For example, the processing logic may determine a threshold standard deviation (e.g., three standard deviations) and may determine the surrounding areas based on the threshold standard deviation, as discussed above. At block 720, the processing logic may determine boundary points based on the surrounding areas. For example, the processing logic may determine boundary points such that the outermost edges of the surrounding areas may be encompassed within the boundary points when the boundary points are connected. The processing logic may determine the predicted area based on the boundary points at block 725. For example, the processing logic may connect the boundary points to form the predicted area, as discussed above.

At block 730, the processing logic may determine a path for the ADV based on the predicted area. For example, the processing logic may determine a reference line that avoids the predicted area, as discussed above. The processing logic may determine sample points based on the reference line. The sample points may also avoid the predicted area, as discussed above. The processing logic may further determine a plurality of segments based on the sample points, as discussed above. The processing logic may further determine the path for the ADV based on the plurality of segments, as discussed above. At block 735, the processing logic may control the ADV based on the path. For example, the processing logic may cause the ADV to move and/or drive along the path.

Note that some or all of the components as shown and described above may be implemented in software, hardware, or a combination thereof. For example, such components may be implemented as software installed and stored in a persistent storage device, which may be loaded and executed in a memory by a processor (not shown) to carry out the processes or operations described throughout this application. Alternatively, such components may be implemented as executable code programmed or embedded into dedicated hardware such as an integrated circuit (e.g., an application specific IC or ASIC), a digital signal processor (DSP), or a field programmable gate array (FPGA), which may be accessed via a corresponding driver and/or operating system from an application. Furthermore, such components may be implemented as specific hardware logic in a processor or processor core as part of an instruction set accessible by a software component via one or more specific instructions.

Figure 8:
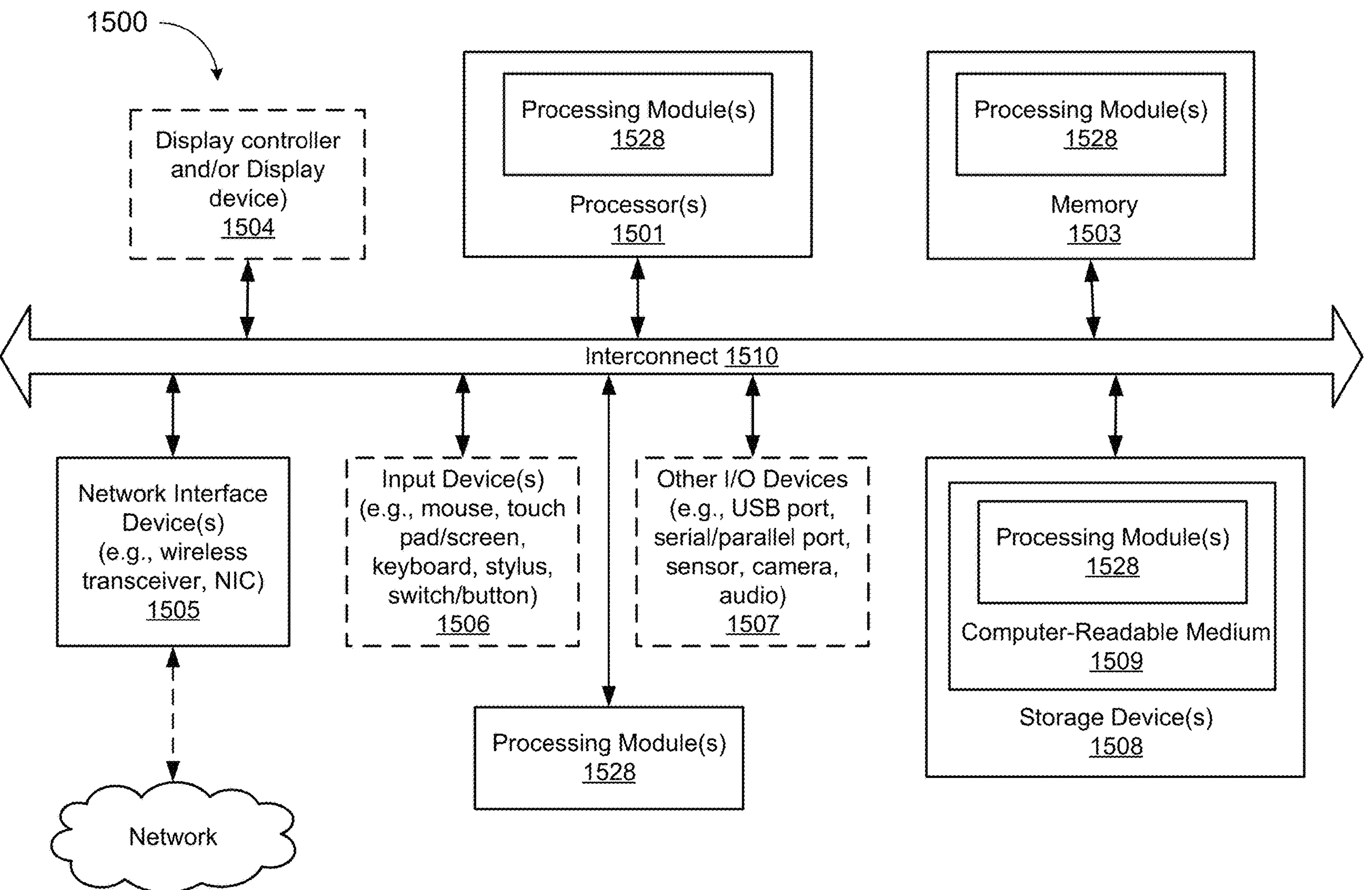
FIG. 8 is a block diagram illustrating a data processing system according to some embodiments.

FIG. 8 is a block diagram illustrating an example of a data processing system which may be used with one embodiment of the disclosure. For example, system 1500 may represent any of data processing systems described above performing any of the processes or methods described above, such as, for example, perception and planning system 110 or any of servers 103-104 of FIG. 1. System 1500 can include many different components. These components may be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term “machine” or “system” shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor may be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment may be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications may be loaded in memory 1503 and executed by processor 1501. An operating system may be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 305, control module 306. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein may be implemented as discrete hardware components or integrated in the functionality of hardware components such as ASICS, FPGAs, DSPs or similar devices. In addition, processing module/unit/logic 1528 may be implemented as firmware or functional circuitry within hardware devices. Further, processing module/unit/logic 1528 may be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle, the computer-implemented method comprising:
- determining a predicted path for a moving obstacle;
- determining a predicted area based on the predicted path for the moving obstacle, wherein the predicted area comprises the predicted path;
- determining a path for the autonomous driving vehicle based on the predicted area, including generating a reference line based on the predicted area, and generating sets of sample points based on the reference line, wherein the sets of sample points, the reference line, and the path avoid the predicted area; and
- controlling the autonomous driving vehicle based on the path.

2. The computer-implemented method of claim 1, wherein determining the predicted path comprises:
- determining a plurality of predicted points in a geographical area where the autonomous driving vehicle is located, wherein the predicted path comprises the plurality of predicted points.

3. The computer-implemented method of claim 2, wherein determining the predicted area comprises:
- determining a plurality of surrounding areas for the plurality of predicted points.

4. The computer-implemented method of claim 3, wherein each surrounding area of the plurality of surrounding areas is determined based on threshold standard deviation from a respective predicted point.

5. The computer-implemented method of claim 3, wherein determining the predicted area further comprises:
- determining a plurality of boundary points, based on the plurality of surrounding areas.

6. The computer-implemented method of claim 5, wherein the predicted area is encompassed within the plurality of boundary points.

7. The computer-implemented method of claim 1, wherein determining the path for the autonomous driving vehicle further comprises:
- generating a plurality of segments between the sets of sample points; and
- determining the path for the autonomous driving vehicle based on the plurality of segments, wherein the path comprises one sample point from each of the sets of sample points.

8. The computer-implemented method of claim 1, wherein the predicted path is determined based on sensor data generated by one or more sensors of the autonomous driving vehicle.

9. The computer-implemented method of claim 8, wherein the sensor data comprises video data and wherein the one or more sensors comprise a camera.

10. The computer-implemented method of claim 8, wherein the sensor data comprises radar data and wherein the one or more sensors comprise a radar unit.

11. The computer-implemented method of claim 8, wherein the sensor data comprises light detection and range (LIDAR) data and wherein the one or more sensors comprises a light detection and range unit.

12. A non-transitory machine-readable medium having instructions stored therein, which when executed by a processor, cause the processor to perform operations, the operations comprising:
- determining a predicted path for a moving obstacle;
- determining a predicted area based on the predicted path for the moving obstacle, wherein the predicted area comprises the predicted path;
- determining a path for the autonomous driving vehicle based on the predicted area, including generating a reference line based on the predicted area, and generating sets of sample points based on the reference line, wherein the sets of sample points, the reference line, and the path avoid the predicted area; and
- controlling the autonomous driving vehicle based on the path.

13. The non-transitory machine-readable medium of claim 12, wherein determining the predicted path comprises:

determining a plurality of predicted points in a geographical area where the autonomous driving vehicle is located, wherein the predicted path comprises the plurality of predicted points.

14. The non-transitory machine-readable medium of claim 13, wherein determining the predicted area comprises:

determining a plurality of surrounding areas for the plurality of predicted points.

15. The non-transitory machine-readable medium of claim 14, wherein each surrounding area of the plurality of surrounding areas is determined based on threshold standard deviation from a respective predicted point.

16. The non-transitory machine-readable medium of claim 14, wherein determining the predicted path further comprises:

determining a plurality of boundary points, based on the plurality of surrounding areas.

17. The non-transitory machine-readable medium of claim 16, wherein the predicted area is encompassed within the plurality of boundary points.

18. The non-transitory machine-readable medium of claim 12, wherein determining the path for the autonomous driving vehicle further comprises:

generating a plurality of segments between the sets of sample points; and determining the path for the autonomous driving vehicle based on the plurality of segments, wherein the path comprises one sample point from each of the sets of sample points.

19. The non-transitory machine-readable medium of claim 12, wherein the predicted path is determined based on sensor data generated by one or more sensors of the autonomous driving vehicle.

20. A data processing system, comprising:

a processor; and a memory coupled to the processor to store instructions, which when executed by the processor, cause the processor to perform operations, the operations comprising:

determining a predicted path for a moving obstacle;

determining a predicted area based on the predicted path for the moving obstacle, wherein the predicted area comprises the predicted path;

determining a path for the autonomous driving vehicle based on the predicted area, including generating a reference line based on the predicted area, and generating sets of sample points based on the reference line, wherein the sets of sample points, the reference line, and the path avoid the predicted area; and controlling the autonomous driving vehicle based on the path.

* * * * *